United States Patent [19]

Hirsenkorn et al.

[11] Patent Number: 5,480,985
[45] Date of Patent: Jan. 2, 1996

[54] PROCESS FOR PREPARING BRANCHED CYCLODEXTRINS

[75] Inventors: Rolf Hirsenkorn, München; Petra Grauvogl, Pfaffenhofen; Silke Scheiding, Unterschleissheim, all of Germany

[73] Assignee: Consortium für Elecktrochemische Industrie GmbH, Munich, Germany

[21] Appl. No.: 272,144

[22] Filed: Jul. 8, 1994

[30] Foreign Application Priority Data

Jul. 26, 1993 [DE] Germany .......................... 43 25 057.2

[51] Int. Cl.$^6$ ...................................................... C08B 37/16
[52] U.S. Cl. ............................ 536/124; 536/46; 536/103; 435/74; 435/101; 435/103
[58] Field of Search .............................. 536/46, 103, 124; 435/74, 91, 101, 103

[56] References Cited

U.S. PATENT DOCUMENTS

| | | | |
|---|---|---|---|
| 4,668,626 | 5/1987 | Kobayashi et al. | 435/95 |
| 4,871,840 | 10/1989 | Kobayashi et al. | 536/103 |
| 4,902,788 | 2/1990 | Zemel et al. | 536/1.1 |
| 4,910,137 | 3/1990 | Kobayashi et al. | 435/74 |
| 4,931,389 | 6/1990 | Kobayashi et al. | 435/95 |
| 5,118,354 | 6/1992 | Ammeraal et al. | 127/40 |
| 5,356,884 | 10/1994 | Hara et al. | 514/58 |
| 5,366,879 | 11/1994 | Kitahata et al. | 435/101 |

FOREIGN PATENT DOCUMENTS

| | | |
|---|---|---|
| 0307534 | 3/1989 | European Pat. Off. . |
| 0565105 | 10/1993 | European Pat. Off. . |
| 4-23802 | 1/1992 | Japan . |
| 4-23994 | 1/1992 | Japan . |
| 2165549 | 4/1986 | United Kingdom . |
| 2193963 | 2/1988 | United Kingdom . |
| 9001566 | 2/1990 | WIPO . |

OTHER PUBLICATIONS

Kubik et al. *Macromol. Chem. Phys.* 1994, 195, 1719–1732.
Kobayashi et al. *Denpun Kagaku* 1991, 38(2), 197–200.
Vetter et al. *Carbohydr. Res.* 1992, 223, 61–69.
Abe et al. *Carbohydr. Res.* 1986, 154, 81–92.
Shiraishi et al. *Agric. Biol. Chem.*, 1989, 53(11), 3093–3095.
Hizukkuri et al., Biotech. Appl. Biochem. 11, pp. 60–73, (1989) "Production of Branched Cyclomaltooctaoses through the Reverse Action of *Klebsiella aerogenes* Pullulanase".
CA 115: 282425j "Heterosaccharide–modified cyclodextrin manufacture".
Kyoko Koizumi et al., Carbohydrate Research, 201(1990), 125–134 "Isolation and Characterization of three positional isomers of diglucosylcyclomaltoheptaose".

Primary Examiner—Douglas W. Robinson
Assistant Examiner—Kathleen Kahler Fonda
Attorney, Agent, or Firm—Collard & Roe

[57] ABSTRACT

A process for preparing branched cyclodextrins has at least one cyclodextrin or cyclodextrin derivative reacted with at least one glycosyl donor in a molar ratio of cyclodextrin/ glycosyl donor of from 1:1 to 1:20, in the presence of a catalyst, and in a solvent.

12 Claims, 3 Drawing Sheets

PROCESS FOR PREPARING BRANCHED CYCLODEXTRINS

BACKGROUND OF THE INVENTION

1. Field of the Invention

The present invention relates to a process for preparing branched cyclodextrins.

2. The Prior Art

Cyclodextrins, also termed cycloamyloses, cyclomaltooligosaccharides or Schardinger dextrins, are cyclic (1→4) α-linked glucopyranoses. They are prepared by the enzymatic degradation of starch. This results mainly in the production of cyclohexaamylose, cycloheptaamylose and cyclooctaamylose, also termed α-, β- and γ-cyclodextrin.

In addition to these cyclodextrins, branched cyclodextrins are also known. These are also designated branched cyclodextrins, cyclodextrin glycosides or $G_n$-cycloamyloses, where n indicates the number of α-D-glucopyranosyl groups in the side chains. These, therefore, are cyclodextrins in which at least one hydroxyl group is linked to glucose, maltose or maltotriose, or generally to substituted or unsubstituted maltooligosaccharides.

It is known to prepare branched cyclodextrins by means of the enzymic glycosylation of cyclodextrin and by means of the pyrolysis of cyclodextrins.

According to Great Britain Patent 2,193,963, the enzymic glycosylation of cyclodextrin is achieved by enzymically reacting a mixture of cyclodextrins and branched maltooligosaccharides using a branch-splitting enzyme.

S. Hizukkuri et al., *Biotech. Appl. Biochem.* 11, 60–73 (1989), describe the enzymic glycosylation of cyclodextrin achieved by reacting cyclodextrin and maltose in the presence of pullulanase.

U.S. Pat. No. 4,668,626 discloses the simultaneous use of a branch-splitting enzyme and β-amylase for the enzymic reaction.

All enzymic processes for preparing the branched cyclodextrins make use of expensive catalysts, have low conversion rates and necessitate elaborate isolation of the reaction products.

WO 90/01566 discloses the pyrolysis of cyclodextrins at from 135° C. to 220° C.

U.S. Pat. No. 5,118,354 discloses the pyrolysis of cyclodextrins at from 110° C. to 170° C.

Acid-catalyzed pyrolysis results in the production of more unwanted hydrolysis product than of branched cyclodextrins. In addition to this, approximately 50% unreacted cyclodextrin remains behind in the reaction mixture and must be separated off in an elaborate manner. An example of the composition of a reaction mixture obtained in this way is 40.3% β-CD, 22.0% branched CD's and 37.6% acyclic maltooligosaccharides (U.S. Pat. No. 5,118,354, column 6, Table 3, sample).

CA 115: 282425j concerns the acid-catalyzed condensation of cyclodextrins with other sugars. The reaction of α-cyclodextrin, sorbitol and fumaric acid at 160° C. is disclosed.

The high reaction temperature is disadvantageous in all pyrolysis processes for preparing the branched cyclodextrins. It leads to unwanted byproducts and exacerbates working up and purification of the reaction products. In addition to this, the conversion rates and conversion selectivities are low.

It is likewise known that small quantities of branched cyclodextrins are contained in the mother liquors from the industrial production of β-cyclodextrin (K. Koizumi et al., *Carbohydr. Res.*, 201, 125–134 (1990)).

SUMMARY OF THE INVENTION

It is an object of the present invention to provide an economically viable process for preparing branched cyclodextrins.

This object is achieved according to the present invention by a process in which at least one cyclodextrin or cyclodextrin derivative is reacted with at least one glycosyl donor in a molar ratio of cyclodextrin/glycosyl donor of from 1:1 to 1:20 in the presence of a catalyst and in a solvent.

In dependence on the solvent and the catalyst which are used, the process according to the invention is preferably carried out at temperatures of between 0° C. and 170° C., and under a pressure of between 100 mm Hg and 1000 mm Hg, in particular under 760 mm Hg, over a period of from 1 to 72, preferably from 2 to 8, hours.

The reaction proceeds in solution or in suspension, preferably in solution. Preferably, the process according to the invention is carried out to a large extent in an anhydrous manner.

The branched cyclodextrins are subsequently isolated from the reaction mixture in a manner known per se, and purified. The starting materials which have not reacted, and have been recovered, may be employed once again in the process according to the invention.

If an ion exchanger has been used as the catalyst, this exchanger must be regenerated in a customary manner before being reemployed.

It is possible to carry out the process according to the invention using a multiplicity of cyclodextrins, cyclodextrin derivatives and glycosyl donors, and the process is thus very flexible. It is very economical, due to the high rates of conversion achieved, and, in addition to this, is simple to carry out and not associated with any elaborate purification steps. The process makes it possible to isolate reaction products which are colored to a lesser extent than it is possible to achieve when using pyrolysis.

All cyclodextrins, such as, by way of example, α-, β- or γ-cyclodextrin, as well as any cyclodextrin derivatives, such as, by way of example, hydroxypropylcyclodextrin or methylcyclodextrin, or any branched cyclodextrins, as well as mixtures of these substances, can suitably be used as starting compounds for the process according to the invention. The use of α-, β- or γ-cyclodextrin is preferred. Commercial grade cyclodextrins with a water content of between 0% and 15% by weight may be employed. They do not have to satisfy any particular requirements as regards purity. For reasons of cost, cyclodextrins or cyclodextrin derivatives having a water content of, as a rule, from 12% to 15% by weight, as are commercially available, are preferably employed.

Glucose, mannose, galactose, fructose, xylose, sorbose, ribose, sucrose, lactose, trehalose, maltose, cellobiose, or their 1-0-glycosylated derivatives, such as methyl-alpha-D-glucopyranoside, methyl-beta-D-glucopyranoside, 1,6-anhydro-beta-D-glucopyranose, beta-D-glucose pentaacetate, N-acetylglucosamine, N-acetylmannosamine or N-acetylgalactosamine, or the previously mentioned cyclodextrins themselves, or mixtures of these substances, are employed as glycosyl donors.

Glucose, mannose, galactose, xylose or maltose, or mixtures thereof, are preferably employed as glycosyl donors.

Glucose is particularly preferably used as the glycosyl donor.

The glycosyl donors can be employed at a purity and freedom from water which are readily available.

Those solvents in which both the cyclodextrin and the glycosyl donor are at least partially soluble may suitably be used as solvents in the process according to the invention.

Toluene, xylene, acetonitrile, formamide, methylformamide, dimethylformamide, N-methylpyrrolidone, DMPU (1,3-dimethyl-3,4,5,6-tetrahydro-2(1H)pyrimidinone), acetamide, methylacetamide or dimethylacetamide, or mixtures thereof, are preferably used as solvents.

The use of dimethylformamide and/or N-methylpyrrolidone is preferred.

The use of dimethylformamide is particularly preferred.

The solvents should preferably be employed in anhydrous form.

The reaction is carried out in the presence of a catalyst. At least one acid and/or at least one acidic ion exchanger is preferably employed as the catalyst.

Anhydrous mineral acids, such as hydrogen chloride, sulfuric acid or phosphoric acid, or sulfonic acids which are soluble in the solvent, such as sulfosuccinic acid or p-toluenesulfonic acid, or mixtures thereof, are preferably employed as acids. Hydrogen chloride gas is preferably employed. Amine hydrochloride, for example, dimethylamine hydrochloride, is likewise suitable for use as the catalyst. The catalyst should preferably be employed in anhydrous form.

Those acidic ion exchangers are used which are suitable for effecting catalysis in organic media. A macroporous, strongly acidic ion exchanger is preferably used. Examples of suitable ion exchangers are AMBERLYST® 15, AMBERLYST® 35 and AMBERLYST® XN 1010.

In order to carry out the variant of the process according to the invention in which acid is employed as the catalyst, at least one cyclodextrin, at least one glycosyl donor and anhydrous acid are added simultaneously or in succession to the solvent. Cyclodextrin and glycosyl donor are employed in a molar ratio of from 1:1 to 1:20, preferably from 1:3 to 1:10, and cyclodextrin and anhydrous acid are employed in a molar ratio of from 1:0.01 to 1:20, preferably 1:1. Increasing the concentration of glycosyl donor in the reaction mixture of the process according to the invention leads to an increase in the yield of multiply glycosylated cyclodextrins. The reaction proceeds at from 0° C. to 80° C., preferably at from 20° C. to 40° C., particularly preferably at about 40° C., over a period of from 10 to 72 hours, preferably of from 24 to 48 hours. Reactions in dimethylformamide containing hydrogen chloride as the catalyst even proceed at room temperature or at a slightly elevated temperature.

Subsequently, the reaction mixture is adjusted, preferably with a mild base and/or by adding a basic ion exchanger, to an alkaline pH (from pH 8 to 10) and stirred at 20° C. to 30° C. for from 2 to 24 hours.

A concentrated solution of ammonia or an aqueous solution of an amine or a solution of sodium hydrogen carbonate is preferably employed as the mild base. AMBERLITE® IR-45 from Rohm and Haas Co., Philadelphia, for example, is used as the basic ion exchanger.

Subsequently, the cyclodextrins and the cyclodextrin derivatives according to the invention are isolated by customary processes.

The isolation is effected, for example, by initially concentrating the mixture to a syrup by means of distillation. The syrup is dissolved in water and precipitated by adding a suitable solvent, such as, for example, acetone, methanol or ethanol. The precipitate is dried. The dried precipitate is dissolved. Water, for example, can be used as the solvent.

The unsubstituted cyclodextrins are precipitated from the aqueous solution. This can be done, for example, by adding known cyclodextrin-complex formers, such as, for example, toluene, cyclohexane or p-cymene, to the solution and filtering off the cyclodextrin as a cyclodextrin-toluene complex which is poorly soluble in water. The filtrate is dried; it consists predominantly of the cyclodextrin derivatives according to the invention.

The products can likewise be purified by other, known methods for purifying cyclodextrin or cyclodextrin derivatives. Examples of such methods are direct crystallization, absorption to active charcoal, ion-exchange chromatography, gel-permeation chromatography or enzymic degradation processes.

If desired, the cyclodextrin derivatives can be further purified, as is known from the state of the art by, for example, column chromatography or preparative HPLC.

In accordance with a second embodiment of the process according to the invention, at least one acidic ion exchanger is employed as the catalyst.

In order to carry out this embodiment of the process according to the invention, at least cyclodextrin or cyclodextrin derivative, at least one glycosyl donor and at least one acidic ion exchanger in the $H^+$ form are added simultaneously or in succession to a solvent. Cyclodextrin and glycosyl donor are employed in a molar ratio of from 1:1 to 1:20; cyclodextrin and the acidic ion exchanger are employed in a ratio by weight of from 1:0.1 to 1:5. The reaction proceeds at from 70° C. to 150° C., preferably at about 100° C., over a period of from 1 to 24 hours, preferably of from 2 to 8 hours.

Following the acid-catalyzed reaction, the acidic ion exchanger is separated off in a manner known per se, preferably by filtration or centrifugation (for example, 10 min at 10 g) of the reaction mixture.

Isolation and, where appropriate, further purification of the reaction products can be effected in the same way as described for the first embodiment of the process according to the invention.

It is also possible, in accordance with the invention, to use acid and an acidic ion exchanger simultaneously.

Using the process according to the invention, glycosylated cyclodextrins are obtained which can be characterized as a statistical, amorphous mixture of $(G_n)_m$-X-CD, where G is identical or different and denotes D-glucopyranosyl-, D-mannopyranosyl-, D-galactopyranosyl-, D-fructofuranosyl-, D-fructopyranosyl-, D-xylopyranosyl-, D-sorbopyranosyl-, D-ribopyranosyl-, β-D-fructofuranosyl-α-D-glucopyranosyl-, 4-O-α-D-glucopyranosyl-D-glucopyranosyl-, 4-O-β-D-glucopyranosyl-D-glucopyranosyl-, 2-acetylamino-2-deoxyglucopyranosyl-, 2-acetylamino-2-deoxymannopyranosyl-, 2-acetylamino-2-deoxygalactopyranosyl- or 2,3,4,6-tetra-O-acetylglucopyranosyl-, and n denotes a number from 1 to 7, m denotes a number from 1 to 16, and x-CD denotes alpha-, beta- or gamma-cyclodextrin, in which m oxygen-bonded hydrogen atoms are replaced by identical or different $G_n$ residues.

Using the process according to the invention, it is predominantly lesser-substituted products, i.e., products which are linked to one glycosyl residue, which are obtained. This product distribution is advantageous, since lesser-substituted cyclodextrins possess, as is well known, better complexing properties than do more highly substituted cyclodextrins.

In the cyclodextrin derivatives obtained according to the invention, the linking position of the side chain, and the stereo chemistry of the glycosidic bond at the branching, are indeterminate. In contrast, the glycosidic bond in the enzymically prepared cyclodextrin derivatives is always alpha $(1\rightarrow 6)$-linked.

The composition of the amorphous mixture varies with the desired degree of conversion of the cyclodextrin. In the case of conversions of up to about 40% derivatives are obtained, with high selectivity, which are in the main substituted by one branching unit. As the degree of conversion increases, more highly substituted cyclodextrin derivatives are obtained. When the cyclodextrin is completely converted, products are obtained which, on average, carry approximately four branching units. Both monosaccharides and oligosaccharide side chains are formed.

The cyclodextrin derivatives according to the invention can be used for all applications that are known for cyclodextrins. They are, for example, well suited for solubilizing substances which are sparingly soluble or insoluble in water, or for separating or extracting substances from lipophilic media.

In pharmaceutical applications, they can, in addition to this, increase the bioavailability of pharmaceutically active substances, or bring about a retardation of such substances.

In foodstuff technology or in cosmetic applications, the substances according to the invention can be employed for stabilizing aromatizing substances or vitamins.

An additional area of application is the replacement of organic solvents by the substances according to the invention or their solutions.

BRIEF DESCRIPTION OF THE DRAWINGS

Other objects and features of the present invention will become apparent from the following detailed description considered in connection with the accompanying drawings which disclose embodiments of the present invention. It should be understood, however, that the drawings are designed for the purpose of illustration only and not as a definition of the limits of the invention.

In the drawings, wherein similar reference characters denote similar elements throughout the several views:

FIG. 1 shows the time/conversion curve for Example 1a;

DETAILED DESCRIPTION OF PREFERRED EMBODIMENTS

The following examples serve to further illustrate the invention. The course of the reactions described in the examples was monitored by means of thin layer chromatography.

The average molecular weight of the products was determined by means of fast atom bombardment mass spectroscopy (f.a.b.MS) and gel-permeation chromatography (GPC).

The percentage proportion of unsubstituted cyclodextrin was determined by means of GPC.

EXAMPLE 1

50 g of β-cyclodextrin (13% water content), 20 g of glucose and 100 g of AMBERLYST® 15 (Rohm und Haas Co., Philadelphia) were stirred, at 100° C. for 13.5 h under atmospheric pressure, in 500 ml of dimethylformamide. Having been removed, the reaction mixture was filtered through a paper filter; the dimethylformamide was distilled off from the filtrate.

The product was dissolved in 80 ml of water. The solution was added dropwise, while stirring, to 320 ml of acetone. The precipitate was centrifuged off and dried in air. After a reaction period of 8 h, the composition of the precipitate was as follows: residual content of β-cyclodextrin, 4.0%; reducing sugars, 13.4%; branched cyclodextrins, 82.6%.

Figure 1:
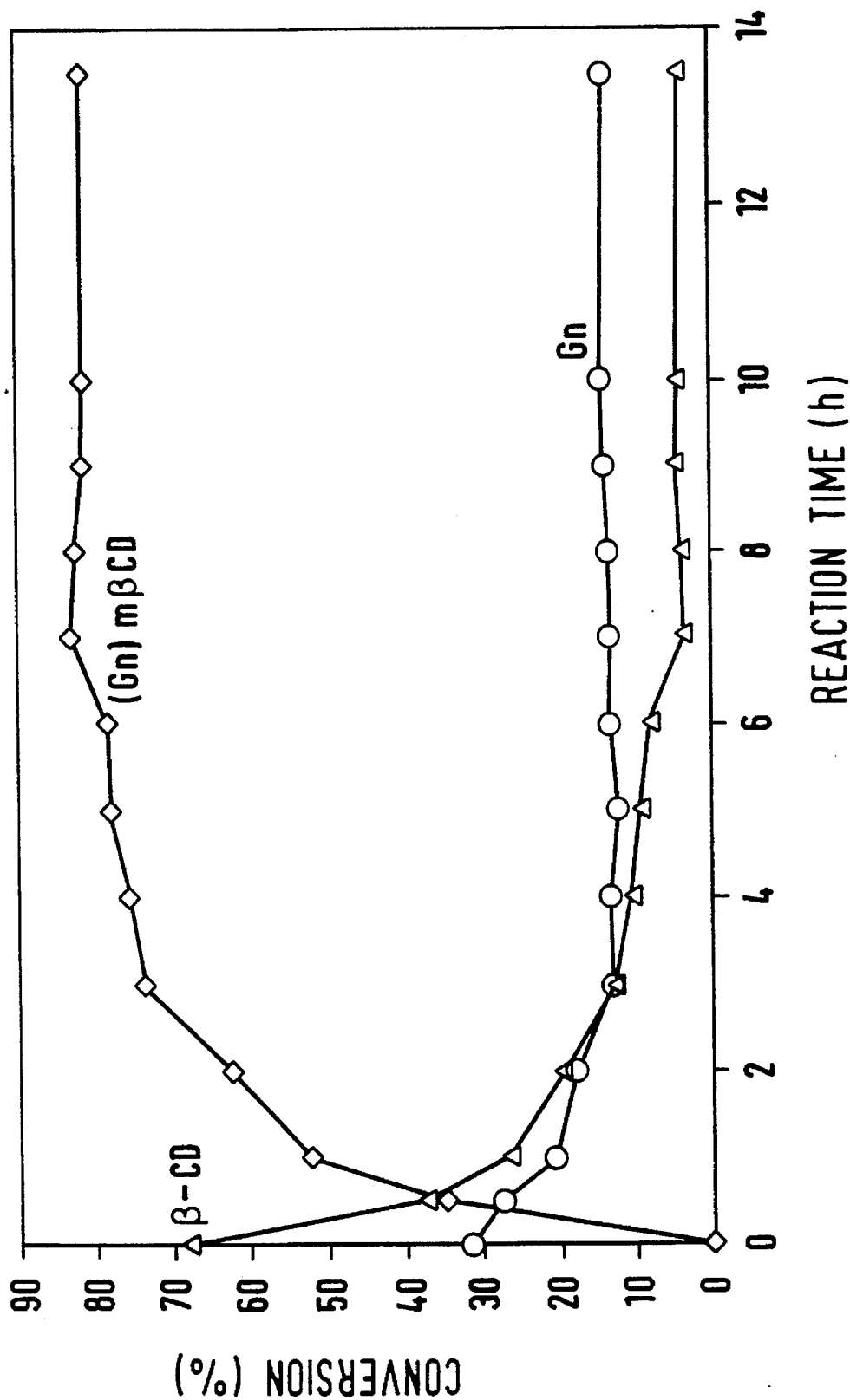

EXAMPLE 1A 5 ml of the mixture was removed from a mixture as described in Example 1 after 30 and 60 minutes and subsequently every 60 minutes, and worked up as described. The time/conversion curve resulting from this is shown in FIG. 1.

EXAMPLES 2 TO 22

Figure 2:
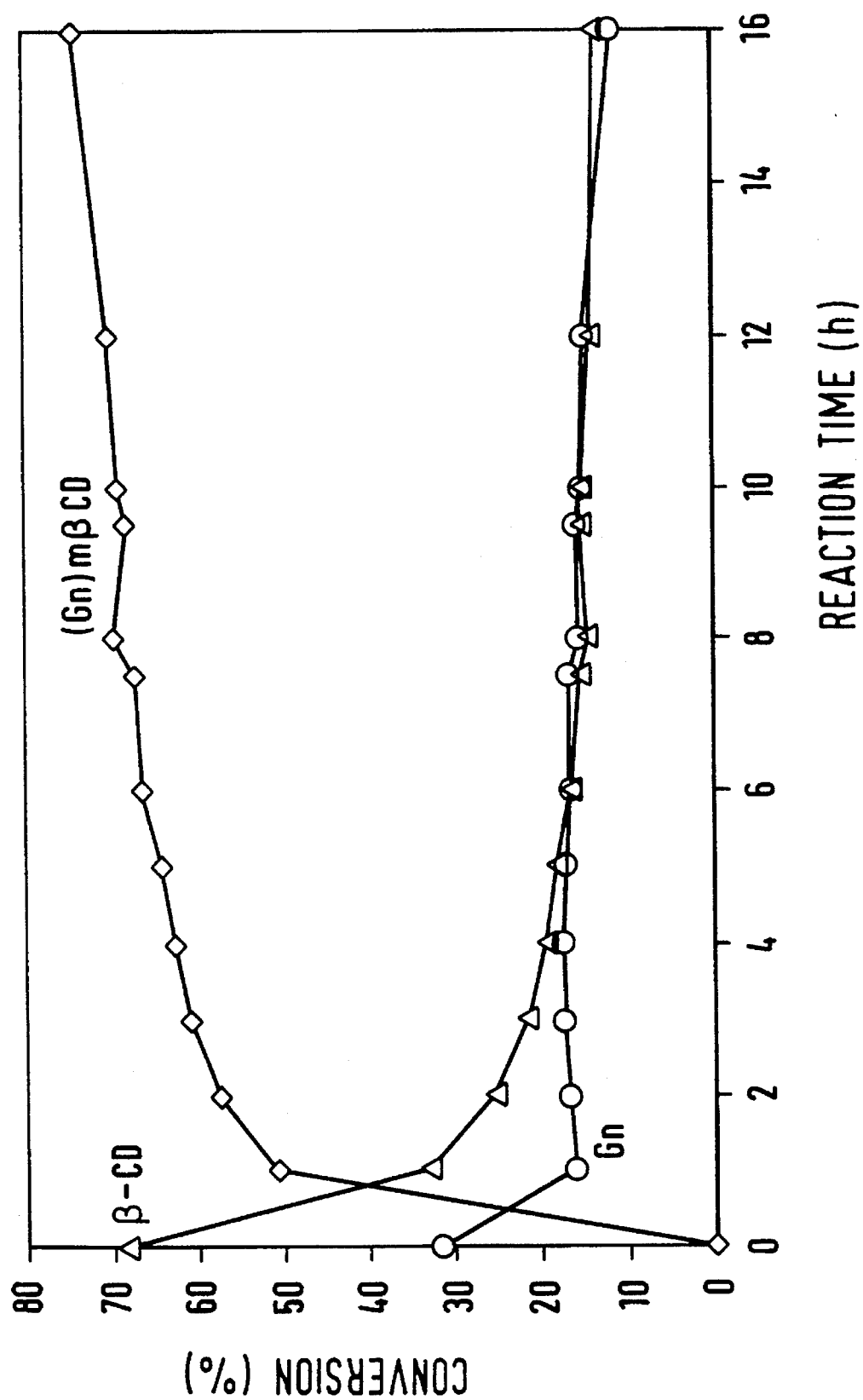
FIG. 2 shows the time/conversion curve for Example 2.

The process according to the invention was carried out as described in Example 1 using the cyclodextrins, glycosyl donors, catalysts and solvents listed in Table 1. Deviations in the conduct of the reaction from the process described in Example 1, and the composition of the reaction products, are likewise listed in Table 1. The time/conversion curve for Example 2 was likewise determined, as described in Example 1a. This time/conversion curve for Example 2 is shown depicted in FIG. 2.

TABLE 1

| | CD | Glycosyl donor | Catalyst | Solvent | Peculiarities | Residual CD | Reducing Sugar | Branched CD's |
| --- | --- | --- | --- | --- | --- | --- | --- | --- |
| 2 | β-CD (50 g) | Glucose (20 g) | A-15 (70 g) | DMF (500 ml) | | 13.3% | 14.7% | 72.0% |
| 3 | β-CD (5 g) | Glucose (2 g) | A-15 (7 g) | DMF (50 ml) | Vacuum | 14.7% | 15.5% | 69.8% |
| 4 | β-CD (5 g) | Glucose (1.4 g) | A-15 (10 g) | DMF (50 ml) | | 4.1% | 12.0% | 83.9% |
| 5 | β-CD (5 g) | Glucose (0.7 g) | A-15 (10 g) | DMF (50 ml) | | 3.5% | 14.0% | 82.5% |
| 6 | β-CD (5 g) | Glucose (2 g) | A-15 (5 g) | DMF (50 ml) | | 25.8% | | |
| 7 | β-CD (5 g) | Glucose (2 g) | A-15 (2 g) | DMF (50 ml) | | 50.1% | | |
| 8 | β-CD (5 g) | Glucose (2 g) | A-15 (5 g) | DMF (25 ml) | 3h | 13.4% | | |
| 9 | β-CD (5 g) | Glucose (2 g) | A-15 (7 g) | DMF (25 ml) | 3h | 5.5% | | |
| 10 | β-CD (5 g) | Glucose (2 g) | p-TosOH (2.8 g) | DMF (50 ml) | | 22.8% | | |
| 11 | β-CD (5 g) | Glucose (2 g) | A-XN 1010 (2 g) | DMF (50 ml) | | 37.0% | | |
| 12 | β-CD (5 g) | Glucose (2 g) | A-XN 1010 (2 g) | NMP (50 ml) | | 30.5% | | |

TABLE 1-continued

| | CD | Glycosyl donor | Catalyst | Solvent | Peculiarities | Residual CD | Reducing Sugar | Branched CD's |
|---|---|---|---|---|---|---|---|---|
| 13 | β-CD (5 g) | Glucose (2 g) | A-15 (2 g) | Toluene (50 ml) | | 51.5% | | |
| 14 | β-CD (5 g) | Glucose (2 g) | A-15 (2 g) | Water (50 ml) | | 58% | | |
| 15 | β-CD (5 g) | Mannose (2 g) | A-15 (7 g) | DMF (50 ml) | | 18.4% | | |
| 16 | β-CD (5 g) | Xylose (2 g) | A-15 (10 g) | DMF (50 ml) | | 13.7% | | |
| 17 | β-CD (5 g) | Sucrose (2 g) | A-15 (10 g) | DMF (50 ml) | | 9.3% | | |
| 18 | α-CD (5 g) | Glucose (10 g) | A-XN 1010 (6 g) | DMF (50 ml) | | 35% | | |
| 19 | γ-CD (5 g) | Glucose (7 g) | A-XN 1010 (6 g) | DMF (50 ml) | | 50% | | |
| 20 | β-CD (5 g) | AGlc (1.25 g) | A-15 (1.25) | Toluene (50 ml) | | 50.5% | | |
| 21 | β-CD (5 g) | MeGlc | A-15 (1.25) | Toluene (50 ml) | | 50.5% | | |
| 22 | β-CD (5 g) | Glucose (2 g) | A-15 (2 g) | DMF (50 ml) | A-15 regener. | 50% | | |

AGlc: 1,6-Anhydro-β-D-glucopyranose
MeGlc: Methyl-α-D-glucopyranoside
p-TosOH: para-toluenesulfonic acid
DMF: Dimethylformamide
NMP: N-methylpyrrolidone

EXAMPLE 23

50 g of β-cyclodextrin (13% water content) and 20 g of glucose were dissolved in 500 ml of dimethylformamide which is saturated with HCl gas. The reaction mixture was stirred at 25° C. for 48 hours. The reaction mixture was alkalized (pH= 8) with 150 ml of ammonia solution (25% strength). The dimethylformamide was distilled off. The product was dissolved in 80 ml of water. The solution was added dropwise, while stirring, to 320 ml of acetone. The precipitate was centrifuged off and dried in air. Residual content of β-cyclodextrin: 15.4%

COMPARATIVE EXAMPLE 1

Figure 3:
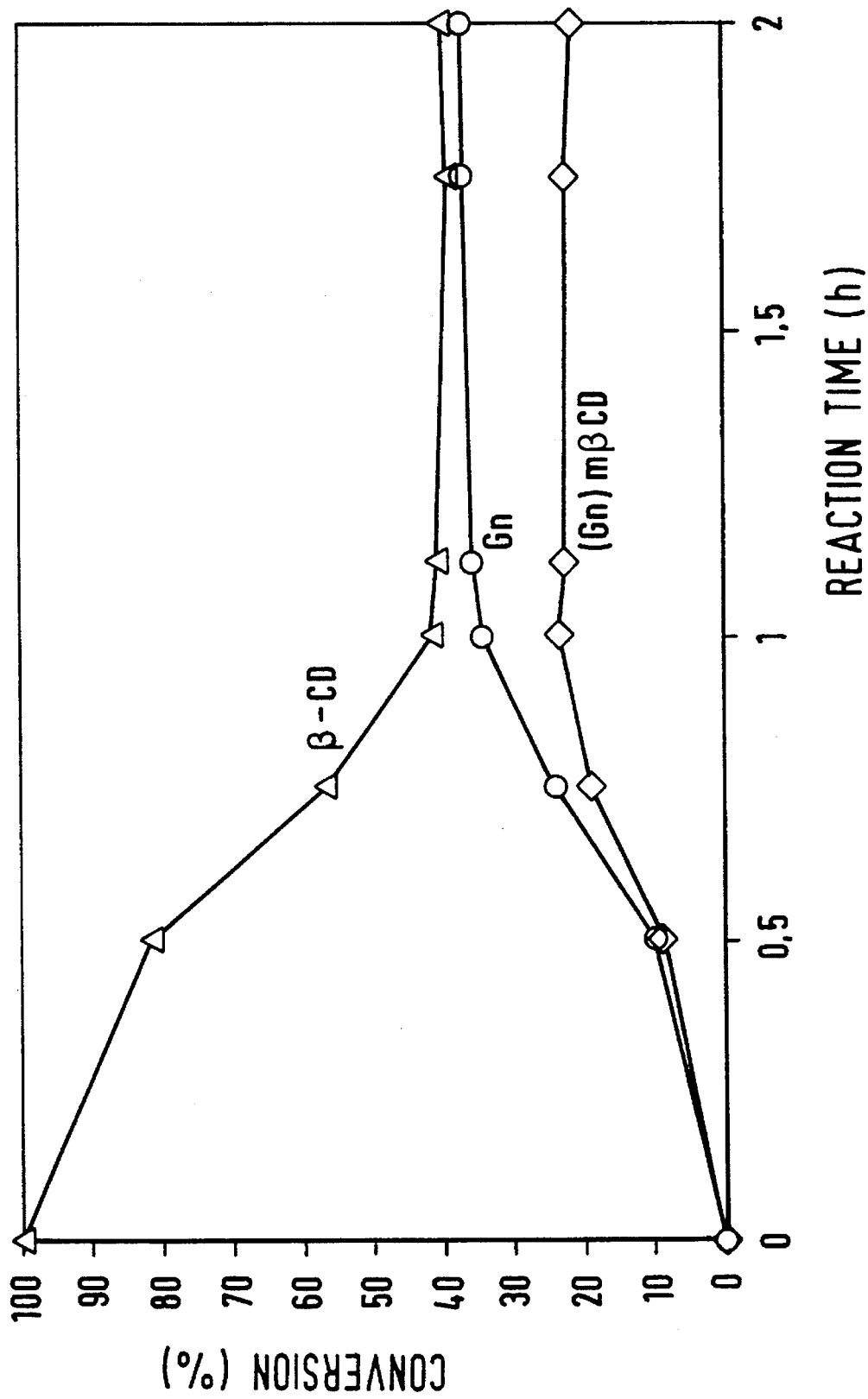
FIG. 3 shows the time/conversion curve for Comparative Example 1.

The method of preparing cyclodextrin derivatives by means of pyrolysis, as described in Example 3 from U.S. Pat. No. 5,118,354, was repeated. The time/conversion curve is shown in FIG. 3.

While several embodiments of the present invention have been shown and described, it is to be understood that many changes and modifications may be made thereunto without departing from the spirit and scope of the invention as defined in the appended claims.

What is claimed is:

1. A process for preparing branched cyclodextrins comprising
   reacting at least one cyclodextrin or cyclodextrin derivative with at least one glycosyl donor selected from the group consisting of glucose, mannose, glactose, xylose, maltose and the mixtures thereof in a molar ratio of cyclodextrin/glycosyl donor of from 1:1 to 1:20 at a temperature between 0° C. and 100° C. and under a pressure of between 100 mm Hg and 1000 mm Hg over a period of from 1 to 72 hours in the presence of a catalyst and in a solvent,
   the catalyst being selected from the group consisting of a waterfree mineral acid and an acidic anion exchanger; and
   the solvent being selected from the group consisting of dimethylformamide and N-methylpyrrolidone.

2. The process as claimed in claim 1, comprising
using α-cyclodextrin, β-cyclodextrin or γ-cyclodextrin as the cyclodextrin.

3. The process as claimed in claim 1, comprising
carrying out the reacting at a temperature between 0° C. to 80° C.

4. The process as claimed in claim 1, comprising
carrying out the reacting at a temperature between 20° C. and 40° C.

5. The process as claimed in claim 1, comprising
carrying out the reacting over a period of from 10 to 72 hours.

6. The process as claimed in claim 1, comprising
carrying out the reacting over a period of from 24 to 48 hours.

7. The process as claimed in claim 1,
wherein said catalyst is hydrogen chloride.

8. The process as claimed in claim 1,
wherein the cyclodextrin and the acidic anion exchanger are utilized in a weight ratio of from 1:0.1 to 1:5, said reacting proceeding at from 70° C. to 100° C., over a period of from 1 to 24 hours.

9. The process as claimed in claim 1,
wherein the solvent is dimethyl formamide.

10. The process as claimed in claim 1,
wherein the solvent is N-methylpyrrolidone.

11. The process as claimed in claim 1,
wherein the catalyst is a water-free mineral acid.

12. The process as claimed in claim 1,
wherein the catalyst is an acidic anion exchanger.

* * * * *